A. RATCLIFF.
COMPOSITION BOARD.
APPLICATION FILED MAY 7, 1920.
1,387,011.
Patented Aug. 9, 1921.
2 SHEETS—SHEET 1.
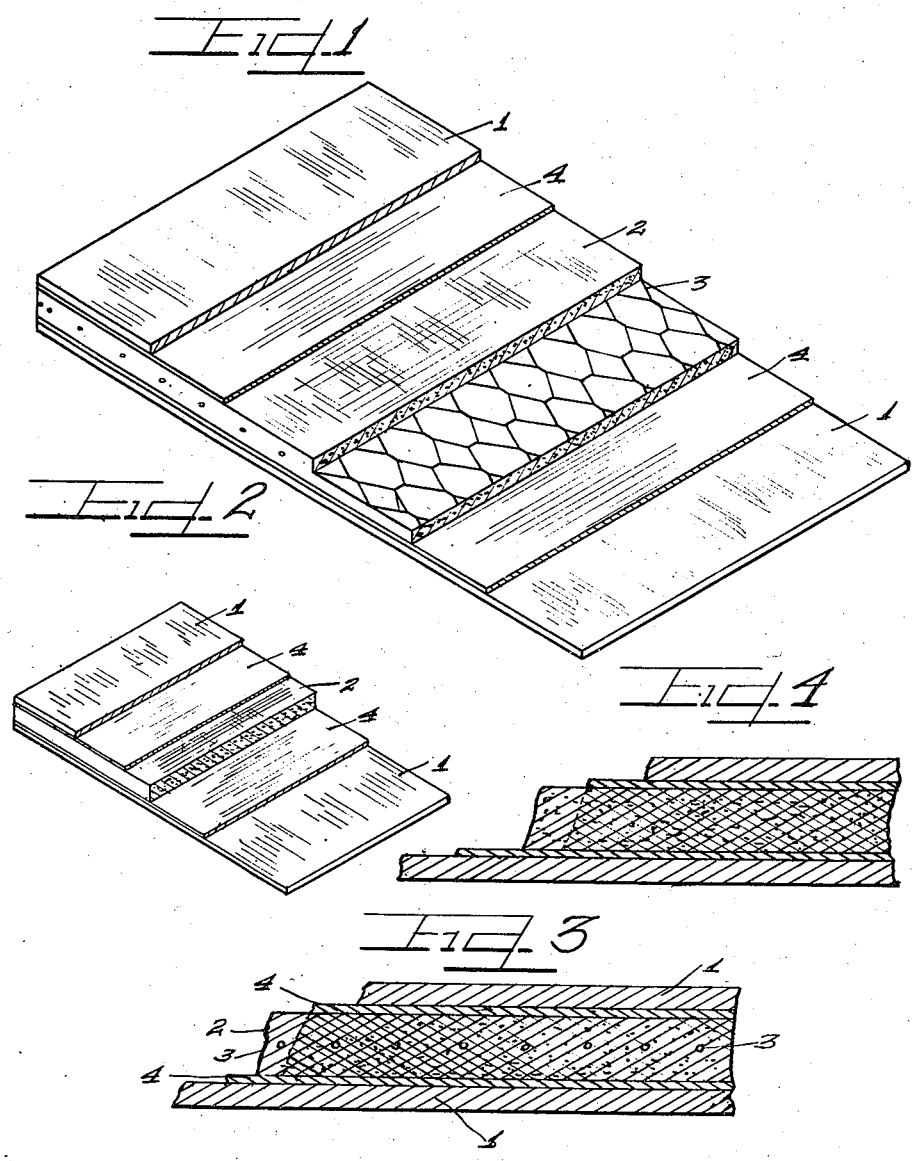

A. RATCLIFF.
COMPOSITION BOARD.
APPLICATION FILED MAY 7, 1920.
1,387,011. Patented Aug. 9, 1921.
2 SHEETS—SHEET 2.
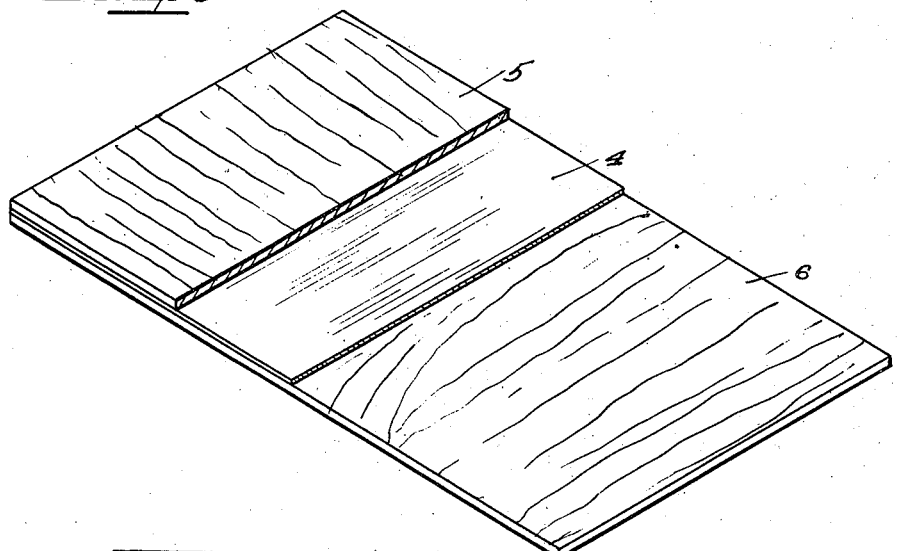
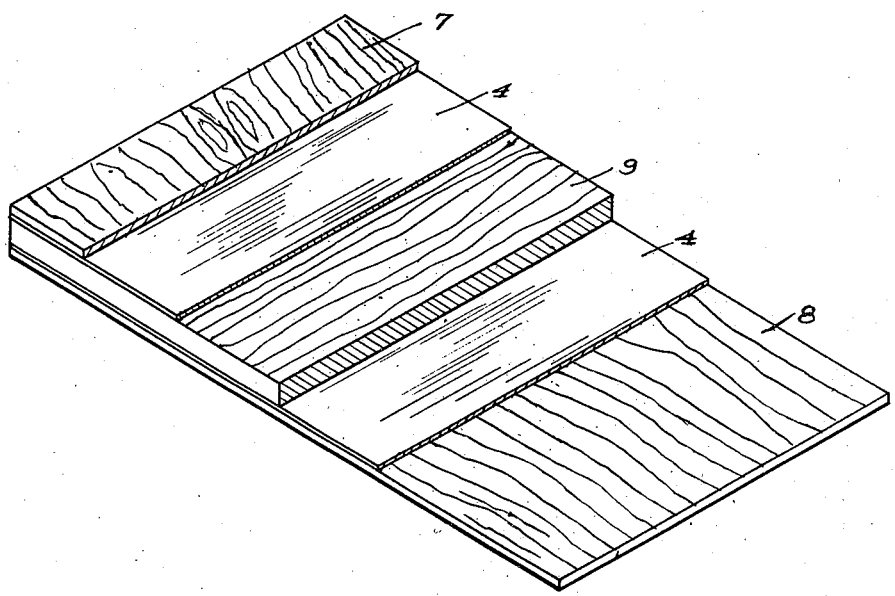

UNITED STATES PATENT OFFICE.

ARTHUR RATCLIFF, OF CHICAGO, ILLINOIS.

COMPOSITION BOARD.

1,387,011. Specification of Letters Patent. Patented Aug. 9, 1921.

Application filed May 7, 1920. Serial No. 379,500.

*To all whom it may concern:*

Be it known that I, ARTHUR RATCLIFF, a citizen of the United States, and a resident of the city of Chicago, in the county of Cook and State of Illinois, have invented certain new and useful Improvements in a Composition Board; and I do hereby declare that the following is a full, clear, and exact description of the same, reference being had to the accompanying drawings, and to the numerals of reference marked thereon, which form a part of this specification.

This invention relates to a composition board and particularly to a composition board which is built up of superposed layers of material having flexible layers of waterproofing material placed therebetween. In the building trade, and in the manufacture of containers of various forms, it is often desirable that a flexible material which is impervious to moisture be provided. Ordinary veneers and composition material do not adequately fulfil the need for this kind of material. Compositions and veneers as heretofore provided are either lacking in flexibility or are too susceptible to the effects of moisture.

It is an object, therefore, of this invention to provide an improved composition board comprising superposed layers of veneer cemented together by layers of flexible waterproof material.

It is also an object of this invention to provide an improved composition board comprising outer layers of veneer and an inner layer of composition material and intervening layers of a flexible waterproof cementing material which is adapted to permeate the inner layer of composition material.

It is also an object of this invention to provide a composition board comprising superposed layers of veneer having the grain thereof extending in opposite directions and cemented together by a layer of flexible waterproof material interposed between the layers of veneer.

It is an important object of this invention to provide a composition board comprising outer layers of veneer and an interposed layer of metallic reinforced composition material with a flexible waterproof cementing material interposed between said layers.

Other and further important objects of this invention will be apparent from the disclosures in the specification and the accompanying drawings.

The invention (in a prefered form) is shown in the drawings and hereinafter more fully described.

On the drawings:

Figure 1 is a perspective view with parts cut away showing one form of construction of the composition board of this invention.

Fig. 2 is a perspective view with parts cut away showing another form of construction.

Fig. 3 is an enlarged fragmentary section through the board shown in Fig. 1.

Fig. 4 is an enlarged fragmentary section through the board shown in Fig. 2.

Fig. 5 is a perspective view showing another form of construction.

Fig. 6 is a perspective view with parts cut away showing another construction of the board of this invention.

As shown in the drawings:

As shown in Fig. 1, the outer layers with the boards of this invention are conveniently formed of veneer or card board portions and are denoted by the reference numeral 1. Interposed between said outer portions 1 is a central portion 2, which ordinarily comprises a composition material such as fiber board or box board and in which is embedded a metallic reinforcement 3. Said metallic reinforcement conveniently comprises wire netting as shown, but may consist of any suitable metallic reinforcement which it is desired to embed in the composition material. Layers of waterproof cementing material 4 between the inner sides of the portions 1 and the outer faces of the portions 2 serve to firmly cement the said portions together and form a unitary flexible waterproof board which has a metallic reinforcement embedded therein. Said cementing material 4 is preferably asphaltum tar, but may consist of pitch or other suitable waterproofing composition.

The board shown in Fig. 2 comprises outer layers 1 of veneer cardboard or other suitable material between which is placed a layer 2 of composition material such as boxboard or fiber board, said layers being cemented together as heretofore described by layers of cementing material 4.

In the form of boards shown in Fig. 5, layers of veneer 5 and 6 are positioned so that their grains are substantially at right angles and are secured together by layers of the cementing material 4.

The board shown in Fig. 6 comprises outer layers of veneer 7 and 8, between which is placed a strip of wood 9 having its grain extending at right angles to the grain of the veneer. The strips of material are cemented together as heretofore described by layers of cementing material 4. It is, of course, to be understood that the arrangement of the various strips of material may be varied and that other material such as paper or leather may be substituted for the veneer or composition in the various forms of board shown.

The improved composition board of this invention is impervious to air or moisture and may be so constructed that any desired amount of flexibility is obtained.

The board is ordinarily constructed by building up the layers of material as shown with intervening layers of waterproofing cementing material and applying a pressure thereon by running between rollers or in any suitable manner. Since the intervening layers are usually of a more porous material, the cementing material usually completely permeates said layers.

I am aware that changes in construction may be made and materials varied without departing from the principles of this invention, and I do not purpose, therefore, limiting the patent granted otherwise than necessitated by the prior art.

I claim as my invention:

1. A composition board comprising outer layers of veneer, intermediate layers of metallic reinforced composition material, and waterproof material interposed between said other layers and said intermediate layers.

2. A composition board comprising outer layers and intermediate layers, metallic reinforcement in the intermediate layers, and a cementing material for securing the layers together.

3. A composition board comprising layers of veneer having layers of fibrous material thereon, and layers of asphaltum tar for cementing the layers of veneer and fibrous material together.

4. A composition board comprising layers of fibrous material, a layer of wooden material thereon, and layers of asphaltum tar for cementing the layers together.

In testimony whereof I have hereunto subscribed my name in the presence of two subscribing witnesses.

ARTHUR RATCLIFF.

Witnesses:
CARLTON HILL,
SPENCER W. GIBBS.